United States Patent [19]
Burvee

[11] 3,765,501
[45] Oct. 16, 1973

[54] AUTOMATIC STEERING SYSTEM

[76] Inventor: Alfred B. Burvee, Fairmount, N. Dak.

[22] Filed: July 27, 1972

[21] Appl. No.: 275,632

[52] U.S. Cl. .......................... 180/79.2 R, 104/244.1
[51] Int. Cl. ............................................. B62d 5/10
[58] Field of Search ................... 104/244.1; 172/26, 172/278; 180/79, 79.2 R; 280/87.2

[56] References Cited
UNITED STATES PATENTS

| | | | |
|---|---|---|---|
| 2,465,660 | 3/1949 | Phillips | 104/244.1 |
| 3,249,366 | 5/1966 | Meyer | 180/79.2 R X |
| 3,343,501 | 9/1967 | Banderet | 104/244.1 |
| 3,395,771 | 8/1968 | Moyer et al. | 180/79.2 R |
| 3,548,966 | 12/1970 | Blacket | 180/79.2 R |

*Primary Examiner*—Evon C. Blunk
*Assistant Examiner*—Johnny D. Cherry
*Attorney*—Ralph L. Dugger et al.

[57] ABSTRACT

An automatic steering system for a tractor with a conventional hydrostatic steering system that includes a guide and sensing device mounted on a guide arm to follow a furrow, a support mounted on the tractor and mounting the guide arm for movement, a hydraulic ram operable to move the guide arm to elevate said device, a rotary valve connected to the hydrostatic system for applying hydraulic fluid to the wheel steering cylinder to steer the tractor, a control valve for operating the guide arm cylinder to move th guide arm to elevate said device and block the rotary valve controlling the steering when the device is elevated, and a linkage connecting the guide arm to the rotary valve to apply hydraulic fluid under pressure to the appropriate end of the steering cylinder for maintaining the tractor in a generally parallel relationship to the furrow as the tractor advances, the linkage including spring mechanism for resiliently retaining the guide arm in preselected lateral relationship to the tractor.

24 Claims, 4 Drawing Figures

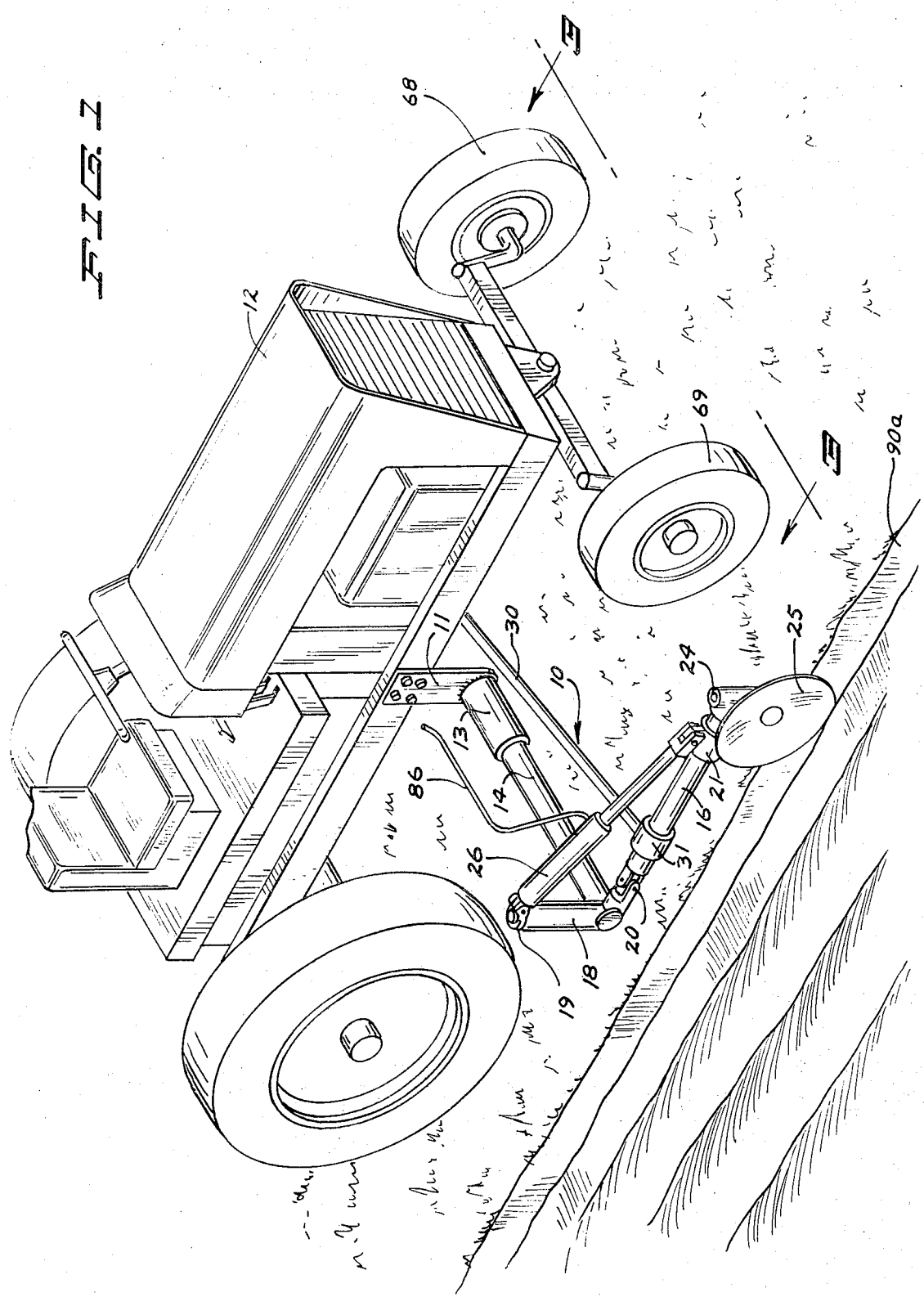

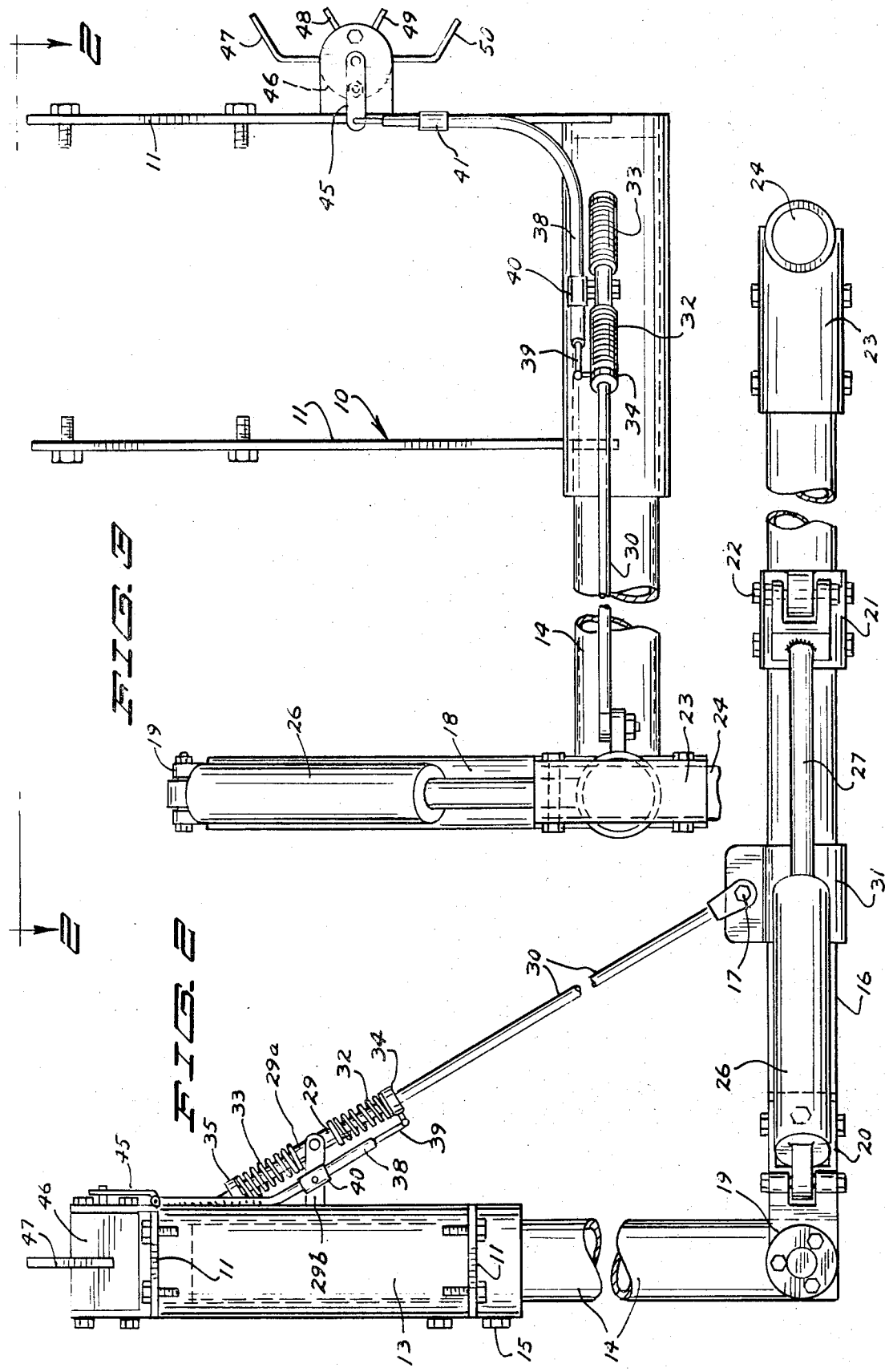

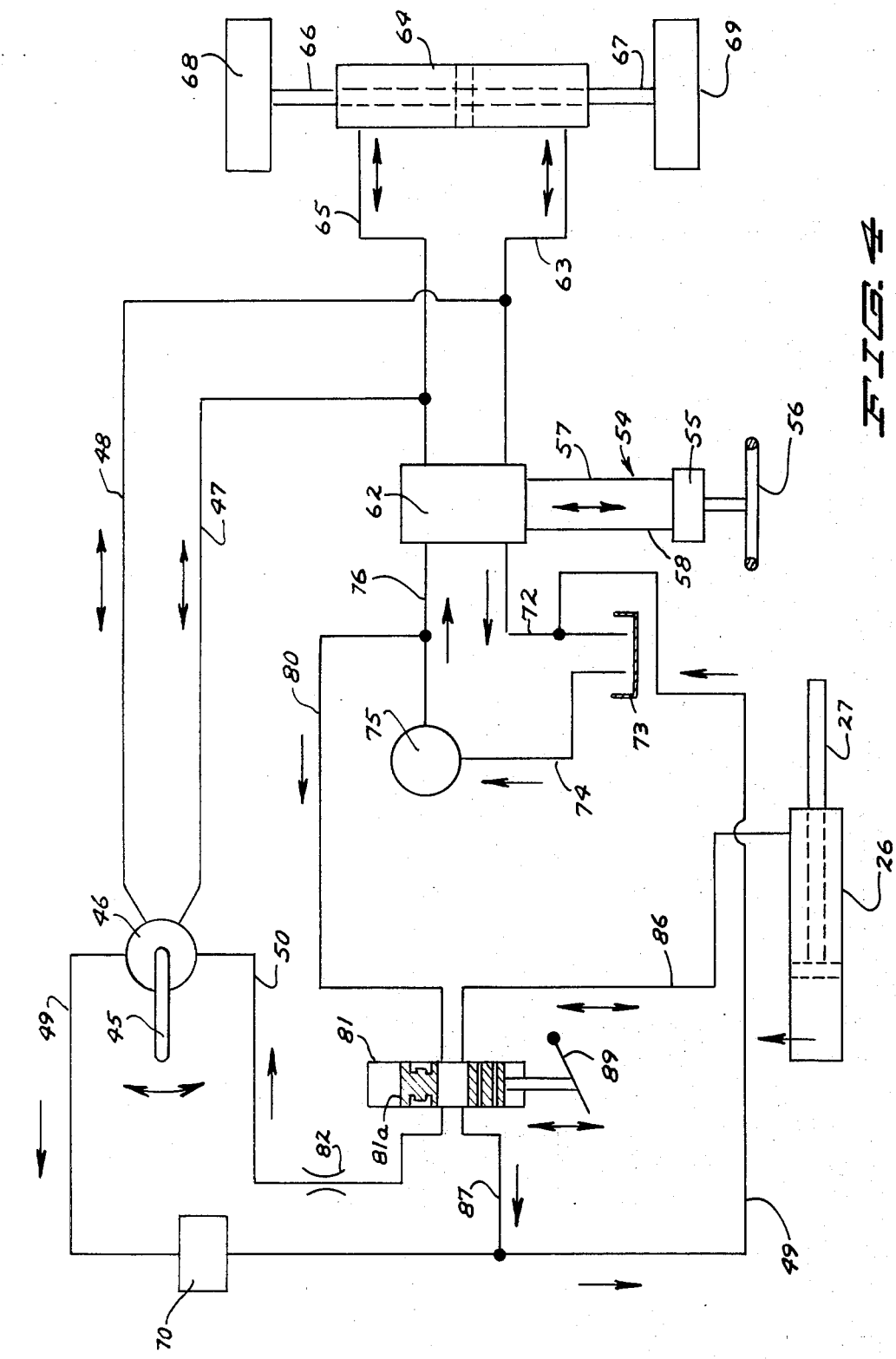

AUTOMATIC STEERING SYSTEM
BACKGROUND OF THE INVENTION

An automatic steering system for a tractor having a conventional manual steering system.

In the prior art it is old to provide a tractor with a hydrostatic power steering system that includes an automatic hydrostatic guidance system such as disclosed in U.S. Pat. No. 3,395,771 to Moyer et al. In order to provide an automatic steering system that is adpated to be connected into conventional nonautomatic hydrostatic steering system and an improved automatic steering system that may be incorporated in with a manual steering system, this invention has been made.

SUMMARY OF THE INVENTION

An automatic steering system for a tractor having a conventional hydrostatic steering system that includes a guide device to follow a furrow, a guide arm mounting the device and mounted by the tractor for movement to permit lateral movement of the device, a hydraulic system including a control valve connected to the hydrostatic system for controlling the application of fluid under pressure to the appropriate end of the hydrostatic steering cylinder, and a linkage connecting the guide arm to the valve to operate the valve in response to movement of the guide arm by lateral movement of the device.

One of the objects of this invention is to provide for tractors having a conventional hydrostatic steering system, a new and novel hydrostatic steering system. In furtherance of the above object, it is another object of this invention to provide new and novel apparatus to cooperate with the automatic steering system for deactivating the automatic steering when the guide device for following a furrow is elevated. Another object of this invention is to provide new and novel mechanism operating on the linkage between a furrow following guide device and a tractor automatic steering hydraulic system for resiliently retaining the guide device in a given lateral spaced relationship to the tractor.

BRIEF DESCRIPTION OF THE DRAWINGS

FIG. 1 is a perspective view of a tractor having the automatic steering apparatus of this invention thereon, said view showing the guide device in a lowered furrow following position;

FIG. 2 is a plan view of the automatic steering device of this invention with portions broken away, said view being generally taken along the line and in the direction of the arrows 2—2 of FIG. 3;

FIG. 3 is a front view of the device of FIG. 2, said view being generally taken along the line and in the direction of the arrows 3-3 of FIGS. 1 and 2; and FIG. 4 is a schematic showing of a conventional hydrostatic steering system, and the hydraulic components and circuitry of this invention connected to said hydrostatic system.

The automatic steering system of this invention, generally designated 10, includes a mounting frame having a pair of spaced vertical plates 11 adapted to be secured to the chassis of the tractor 12 to extend downwardly therefrom for mounting a cross tube 13 that extends beneath the chassis and outwardly to the right thereof. A second cross tube 14 is telescopically mounted by the tube 13 to extend outwardly of the right side of the tractor and is held in a desired lateral adjusted position by set screws 15. A third frame tube, side arm 16, is attached to the outer end of the tube 14 by a universal joint 20 for pivotal movement about vertical and lateral axes. A cylinder 26 of the guide arm lift ram is attached to the upper end of the vertical member 18 by a flange bearing universal bracket 19 for pivotal movement about vertical and horizontal axes, the vertical member 18 being joined to the outer end of tube 14 to extend thereabove. The piston rod 27 of the guide arm lift ram is pivotally connected to the guide arm 16 by a ram lower bracket 21 which is held in a desired adjusted position by set screws 22. A guide device bracket 23 is mounted on the forward end of the guide arm 16 and dependingly mounts an axlehub combination 24. Combination 24 mounts a guide device 25 such a disc or mono-rib tire for rotation about a horizontal axis. The bracket 23 is held in a desired lateral and radial adjusted position by set screws whle the axle of said combination is inserted perpendicularly through the attachment bracket 23 and held in a desired vertical adjusted position by set screws (not shown).

A tie rod universal joint 29 is mounted on the forward side of the cross tube 13 midway between vertical members 11. One end of tie rod 30 is pivotally attached at 17 to the tie rod bracket 31 which is mounted on the guide arm 16. Tie rod bracket 31 is held in a desired laterally adjusted position by set screws. The opposite end portion of the tie rod is slidably extended through a coil spring 32, the tubular portion 29a of tie rod universal joint 29 and coil spring 33; and is held in a desired adjusted position by the push-pull control cable finger collar 34 and tie rod spring adjusting collar 35 that are retained in selected adjusted positions on the tie rod by set screws (not shown). Thus the coil spring 33 at one end bears against collar 35 and at the opposite end against the tie rod universal joint 29, while coil spring 32 at one end bears against the universal joint 29 and at the opposite end against the collar 34 to resiliently urge the guide arm to a datum position that normally is located in a plane parallel to a direction of straight ahead movement of the tractor. Not mentioned is that tubular portion 29a is mounted for pivotal movement relative the frame about axes at right angles to one another by universal portion 29b of joint 29.

The sheath 38 for push-pull control cable 39 is mounted by a swing mount 40 and the cable mount 41, mount 40 being loosely mounted on the top of the tie rod universal joint 29 to permit movement to coaxially align itself with the tie rod while the mount 41 is mounted on plate 11 adjacent rotary control valve 46. One end of the cable 39 is fastened in an adjusted position to the collar 34, the intermediate portion of the cable being slidably extended through the sheath, and the opposite end of the cable being fastened to the control valve lever 45 which is connected to the control spool (not shown) of a four-way rotary control valve 46. Since valve 46 may be a conventional valve, for example, are sold under the proprietary name of "Microtork Valve" by George M. Pearse & Co. of Rahway, N.J., the construction thereof will not be described.

Rotary control valve 46 is coupled into a tractor standard hydrostatic steering system, generally designated 54, by hydraulic lines 47, 48, 49 and 50 (See FIG. 4). The conventional system 54 includes a manually operated pump 55 that is controlled by the tractor steering wheel 56 to control the direction of fluid flow from pump 55 through lines 57, 58 to the control ports of the control valve 62 which has a neutral position blocking fluid flow therethrough from a line 76 to either of lines 63, 65, another position fluidly connecting line 76 to line 65 and line 72 to line 63, and a third position fluidly connecting line 76 to line 63 and line 72 to line 65. A third port of the control valve 62 is connected by a line 63 to one end of the cylinder 64 of a piston cylinder combination 64, 66, 67; while the fourth port is connected by a line 65 to the other end of the cylinder. The combination 64, 66, 67 includes a piston with piston rods 66, 67 extending outwardly therefrom in opposite directions to be connected to the tractor front wheels 68 and 69 respectively for steering the tractor. Piston rods 66, 67 are moved by pressure applied to the appropriate ends of the cylinder 64 to turn the left and right wheels 68, 69 of the tractor for steering the tractor. The return port of the control valve 62 is connected by a line 72 to the reservoir 73, a line 74 connecting the reservoir to the engine driven pump 75 which in turn is connected by a pressure line 76 to the pressure port of the control valve 62. Depending on the way the steering wheel is turned, pressure in one of the lines 57, 58 is increased and fluid flows in a closed circuit of the appropriate part of valve 62, pump 55 and lines 57, 58 in the appropriate direction to operate the valve to have pressurized fluid from line 76 flow into the respective one of line 63, 65 for steering the tractor in a conventional manner.

In accordance with this invention, the pressure line 80 is connected to line 76 between pump 75 and valve 62 and to the pressure port of valve 81. A flow control valve 82 is provided in pressure line 50 which connects a second port of valve 81 to the pressure port of valve 46, return line 49 being connected between the return port of valve 46 and the reservoir 73. A pressure regulator 70 is provided in line 49 between the junction of lines 49, 87 and valve 46. A third port of the rotary control valve 46 is connected by line 48 to line 63 while the fourth port of said valve is connected by line 47 to line 65. A third port of valve 81 is connected by line 86 to one of the two ports of the guide arm cylinder 26, the second of said two ports being vented to the atmosphere to allow the cylinder 26 to flow free. That is, when fluid under pressure is applied through line 86 to the cylinder 26, the guide arm is pivoted about the lateral horizontal pivot axis of pivot 20 to elevate the disc 25. The fourth port of valve 81 is connected by a line 87 to line 49.

When lever 89 which is connected to the control spool 81a of valve 81 is in the intermediate neutral position, there is no fluid connection through valve 81 between any of the lines 50, 80, 86 and 87. However, when the lever 89 is manually moved to the right, the spool of valve 81 continues to block any fluid connection through the valve between lines 50 and 87, but permits fluid flow from line 80 to line 86 and then to the cylinder 26 for retracting the piston rod 27 of the cylinder 26. After piston rod 26 is fully retracted, the pressure in valve 81 operates the spool to a detent position through a conventional fluid circuit (not shown) to block any fluid communication through the valve between lines 86, 87 and 50. When the lever 89 is moved to the left, the spool valve 81 moves and places line 86 in fluid communication with line 87 whereby fluid in the ram 26, 27 will flow through line 86 and line 87 back to the reservoir. As the fluid pressure in line 86 decreases, the piston rod of cylinder 26 is allowed to move to an extended position to thereby allow the guide arm 16 to pivot in a direction that the disc 25 is lowered. Further, at this time valve 81 places line 80 in fluid communication with line 50 to make the rotary control valve 46 operational. Pressure regulator 70 is provided to prevent lines 47, 48 draining.

When the rotary control valve 46 is operational, in its neutral position, no fluid flow under pressure flows therethrough from line 50 to any one of lines 47–49 while if lever 45 is moved from the neutral positions in one angular direction, fluid under pressure flows from line 80, through valve 81, and line 50 to and through the valve 46 to line 47 which is fluidly connected to line 65, and lines 48, 49 are fluidly connected. As a result piston rods 66, 67 are moved for turning the tractor in one direction. If the lever 45 is moved from its neutral position in the opposite angular direction, the pressurized fluid in line 50 flows through valve 46 to line 48 and thence to line 63 to cylinder 64 to operate the piston rods 66, 67 for turning the tractor in the opposite direction. At this time, valve 46 places line 47 in fluid communication with line 49. Due to the flow control valve 82 being located in line 50 the flow of fluid under pressure is at the reduced pressure from that flowing through valve 62 and lines 65, 63 when valve 62 is in its appropriate position whereby steering by the steering wheel 56 will override the automatic steering system of this invention to thereby allow the operator to take over the control or the tractor steering, if some unforseen instance makes it desirable to do so.

In using the apparatus of this invention, the operator steers the tractor with, for example, a plow therebehind into the field and plows the first length of the field with the ram 26, 27 retaining the sensing element 25 in an elevated condition. Thereafter, the operator moves the tractor and aligns it with the previous established furrow, thence operates lever 89 to the left to permit fluid under pressure exhausting from cylinder 26 whereby the guide arm moves to a generally horizontal condition. Therafter, any adjustments such as adjusting the position of the tube 14 relative tube 13, the angular and vertical position of the hub-axle combination 24 relative the attachment bracket 23 etc. are made so that the concave surface of the disc 25 is toward the tractor and the furrow wall 90a and contacts the soil on the bottom of the furrow. Now the operator moves lever 89 to make valve 49 operational and thence is free to release the tractor steering wheel and allow the tractor to run the length of the field. As the disc comes into contact with the furrow wall, its lateral movement is stopped and remains against the furrow wall. Then as the tractor advances, the tractor tends to move toward or away from the furrow, however, such movement results in the tie rod 30 moving against the resilient urging of springs 32, 33 and move the push-pull cable collar 34. As the collar 34 is moved, the push-pull cable is also moved to in turn move the crank 45. That is as the crank 45 is moved, the crank in turn rotates the spool of the rotary control valve to change the flow of hydraulic fluid through lines 47–50. As the flow through the aforementioned lines changes, this produces a flow of hydraulic fluid to the appropriate end of cylinder 64 to control the front wheels 69, 68 of the tractor to automatically steer the tractor. In this manner, the steering operation is entirely automatic and causing the tractor to steer either toward or away from the furrow whichever the case may be for maintaining the tractor in the desired lateral spaced relationship to the furrow. To be mentioned is that the farther crank 45 is moved in either direction from its neutral position, the greater the cross-sectional area of the pressure and return paths through the valve.

When the tractor reaches the end of the field, the operator takes over the control of the tractor steering, including operating lever 89 for making valve 46 nonoperational and elevating the disc 25 out of the furrow. As the guide arm pivots about the horizontal axis of joint 20 for elevating the disc, the guide is retained or returned to its datum lateral position relative the tractor by the force exerted on the tie rod through the coil springs 32, 33. After the operator completes turning the tractor and again positions the tractor next to the furrow, the automatic steering system is again actuated including lowering disc 25, and steers the tractor as is previously described.

In using the apparatus of this invention for row crop operation, the sequence of operation remains the same as previously been described with the exception of the following changes. When the operator is planting row crops, a grooving attachment is mounted on the rear of the planter spaced between the rows a desired distance laterally from the tractor chassis. The grooving attachment packs the soil and causes a groove to be formed as the tractor and planter advance down the field. When the farmer wishes to cultivate the row crops, a mono-rib tire is used in place of disc 25, the mechanism mounting the tire being adjusted for properly spacing the tire from the tractor. Now the tractor is lined parallel to the groove that has been previously formed in the soil, and after this has been completed, the lever 89 is moved for lowering the tire into the groove.

With lever 89 in its right position the automatic steering system is not operational and does not affect steering that is controlled by the steering wheel 56 while fluid under pressure is applied to the guide arm ram for retaining the guide element elevated. As a result the tractor can travel at relatively high speeds without any influence on manual control of the steering of the tractor and thus valve 81 provides a safety feature.

It is to be understood that two cylinders may be used in place of cylinder 64.

What is claimed is:

1. For a tractor that is usually operated to travel in a longitudinal direction and has a steerable ground engaging wheel and a hydrostatic steering system that includes a two-way piston cylinder combination connected to a steerable wheel and a first hydraulic circuit for applying fluid under pressure to the cylinder and return fluid from the cylinder in response to the manual steering of the tractor, said first hydraulic circuit including a source of fluid under pressure, and hydraulic lines connected to the opposite ends of the cylinder, an automatic steering system that includes a second hyraulic circuit having pressure line means connected to said source, a return first line, a second line connected to one of the said lines of the first hydraulic circuit, a third line connected to the other of the said lines of the first hydraulic circuit, and operatable control valve means movable between a first position blocking fluid flow from the pressure line means to either of the second and third lines, a second position fluidly connecting the pressure line means to the second line and the third line to the first line, and a third position fluidly connecting the pressure line means to the third line and the second line to the first line, and guide means mounted on the tractor for following a furrow or the like for operating the control valve means between its positions to control the flow of fluid through the first, second and third lines and thereby through the said line of the first hydraulic circuit to automatically steer the tractor.

2. The apparatus of claim 1 further characterized in that said control valve means comprises a four-way rotary control valve.

3. The apparatus of claim 1 further characterized in that the above guide means includes a frame mounted on the tractor, a guide element to follow in a furrow or the like, guide arm means movably mounted on the frame for mounting the guide element for lateral movement relative the tractor, a tie rod having one end portion connected to the guide arm means for movement therewith and an opposite end portion, and means for connecting said opposite end portion to the control valve means for operating the valve means between its positions as the tie rod moves.

4. The apparatus of claim 3 further characterized in that the first mentioned guide means includes mounting means mounted on the frame for mounting the opposite end portion for slidably and pivotal movement relative the frame and resilient means mounted on the tie rod for resiliently urging the tie rod to slide relative the mounting means to a datum position relative thereto to thereby resiliently retain the guide arm in a datum lateral position relative the tractor.

5. The apparatus of claim 4 further characterized in that mounting means includes a tubular portion having the tie rod end portion slidably extended therethrough, a first and second collar mounted on the tie rod opposite end portion in fixed positions spaced from the tubular portion and on opposite sides thereof, a first spring on the tie rod bearing against the first collar and the tubular portion and a second spring on the tie rod bearing against the second collar and the tubular portion.

6. The apparatus of claim 5 further characterized in that the guide arm means includes a guide arm having a first end portion mounting the guide element and a second end portion, universal joint means for mounting the guide arm second end portion on the frame for pivotal movement about a generally vertical axis and a horizontal axis and ram means mounted on the frame and connected to the guide arm for selectively pivoting the guide arm about said horizontal axis to move the guide element between a ground engaging position and an elevated position relative thereto.

7. The apparatus of claim 6 further characterized in that said mounting means includes universal joint means for mounting the tubular portion on the frame and that the tie rod one end portion is pivotally connected to the guide arm.

8. The apparatus of claim 6 further characterized in that said ram means includes a ram cylinder, and that said pressure line means includes a fourth line connected to the pressure source, a fifth line connected to the first control valve means for applying fluid under pressure thereto, a return sixth line and second line means connected to the ram cylinder for conducting fluid to and from the ram cylinder, and second control means connected to the fourth, fifth and sixth lines and the second line means for selectively blocking flow of fluid under pressure from the fourth line to the sixth line while connecting the fourth line to the second line means for applying fluid under pressure to the ram cylinder for moving the guide arm to the guide arm elevated position and a second position connecting the second line means to the return line and the fourth line to the sixth line, said second control valve means in its second and third positions fluidly connecting the sixth line to the second line and third line respectively.

9. For a tractor having a steerable ground engaging wheel and a hydrostatic steering system that includes a two-way piston cylinder combination connected to the steerable wheel for turning it to steer the tractor, and a manually controlled first hydraulic circuit for applying fluid under pressure to the cylinder and return fluid from the cylinder in response to manual steering of the tractor, said first circuit including a source of fluid under pressure, a first line connected to one end of the cylinder and a second line connected to the other end of the cylinder, an automatic steering system that includes a guide element, a frame connected to the tractor, means for mounting the guide element on the frame for vertical movement between a ground engaging position and an elevated position and lateral movement independent of the vertical movement, ram means mounted on the frame and connected to the guide element mounting means, first control valve means fluidly connected to said first circuit and operable between a first position for applying fluid under pressure to either of the first and second lines, a second position for applying fluid under pressure to the first line and return fluid from the second line and a third position for applying fluid under pressure to the second line and return fluid from the first line, control means connected to the guide means and the first control valve means for operating the first control valve means between its position in response to the movement of the guide means when the guide element moves laterally, and manually operated second control valve means connected to said circuit, said first control valve means and said ram means and operable between a first position applying fluid under pressure from the pressure source to the first control valve means to pass therethrough when the first control valve means is in either of its second and third positions while blocking the flow of fluid under pressure to said ram means and a second position blocking the flow of fluid under pressure to flow through the first control valve means to either of the first and second lines and applying fluid under pressure to the ram means for moving the guide means to elevate the guide element.

10. The apparatus of claim 9 further characterized in that said first control valve means comprises a third line fluidly connected to the first line, a fourth line fluidly connected to the second line and a first valve operable between the first valve means positions and having separate ports fluidly connected to the third and fourth lines respectively, and that the second control valve means includes a second control valve operable between the second valve means positions and having at four separate ports, pressure fifth line fluidly connecting one of the second valve ports to the pressure source, a pressure sixth line fluidly connecting a second of the second valve ports to the first valve, a seventh line fluidly connecting a third of the second valve ports to the ram means and a return line connected to the first valve, a fourth of the second valve ports and to the first circuit.

11. The apparatus of claim 9 further characterized in that the first valve means includes a control valve and a lever for operating the valve between the first control valve means positions, that the control means for the guide means includes a tie rod having one end portion pivotally connected to the guide means to move therewith and a second end portion and means for connecting the second end portion to the lever to move the lever in the proper direction for operating the control valve between its positions to automatically steer the tractor when the guide element is tracking in a furrow or the like.

12. The apparatus of claim 11 further characterized in that the means connected to the second end portion includes means mounted on the frame for mounting the tie rod second end portion for slidably and pivotal movement relative the frame, and first and second resilient means mounted on the second end portion on opposite sides of the tie rod mounting means to resiliently urge the tie rod to a given slidable position relative the tie rod mounting means to thereby resiliently urge the guide means to a datum lateral position relative the tractor.

13. The apparatus of claim 12 further characterized in that the means for connecting the lever to the tie rod comprises a push-pull cable and that the first valve comprises a four-way rotary valve and that the guide element comprises a disc.

14. The apparatus of claim 12 further characterized in that the guide means comprises a generally longitudinally elongated guide arm having a first end portion, an intermediate portion and a second end portion and universal joint means for mounting the guide arm first end portion on the frame for pivotal movement about a vertical axis and a pivot axis at right angles to the vertical axis, said tie rod first end portion being connected to the intermediate portion for pivotal movement relative thereto about a generally vertical axis when the guide element is in a ground engaging position.

15. A tractor having a chassis, a ground engaging steerable wheel mounted on the chasis, a two-way piston cylinder combination, including a cylinder, connected to the steerable wheel for steering it, a manually operated steering wheel, a frame mounted on the chassis to extend laterally outwardly thereof, a generally longitudinally elongated guide arm having a first end portion and a second end portion, universal joint means for mounting the guide arm first end portion for pivotal movement about a generally vertical axis and a horizontal axis at about right angles to the direction of elongation of the guide arm, a ram connected to the guide arm for selectively pivoting the guide arm about said horizontal axis for varying the elevation of the second end portion, means for mounting the ram on the frame, a guide element for engaging the ground to follow a furrow or the like, means for mounting the guide element on the second end portion, a tie rod having one end pivotally connected to the guide arm intermediate its end portions to move with the guide arm and an opposite end portion, and an operable hydraulic circuit connected to said cylinder and said ram for applying fluid under pressure to the appropriate end of the cylinder for steering the ground engaging wheel in response to manually steering and movement of the tie rod second end portion and selectively applying fluid under pressure to said ram for pivoting the guide arm about said horizontal axis.

16. The apparatus of claim 15 further characterized in that the ram includes a ram cylinder, that the frame includes an upright laterally outwardly of the frame, said upright having an upper end portion, and that the ram mounting means comprises means for mounting the cylinder on said upper end portion for pivotal movement about a generally vertical axis and a generally horizontal axis.

17. The apparatus of claim 15 further characterized in that there is provided tie rod mounting means for mounting the tie rod second end portion on the frame for slidable movement, and first and second resilient means on the tie rod respectively on opposite sides of the tie rod mounting means for resiliently urging the tie rod to a given slidable position relative the tie rod mounting means.

18. The apparatus of claim 15 further characterized in that said hydraulic circuit includes a reservoir, a pump fluidly connected to the reservoir, a pressure first line fluidly connected to the pump, a second line fluidly connected to one end of the cylinder, a third line fluidly connected to the second end of the cylinder, return line means connected to said reservoir, an operable first control valve having a neutral first position, a second position for fluidly connecting the first line to the second line and the third line to the return line means and a third position for fluidly connecting the first line to the third line and the second line to the return line means, means for connecting the steering wheel to the first valve for operating the first valve between its positions in response to turning the steering wheel and hydraulic circuit means fluidly connected to said lines and line means in parallel to the control valve for applying fluid under pressure to one of the second and third lines and return fluid from the other in response to movement of the tie rod moving with the guide arm about said vertical axis.

19. The apparatus of claim 18 further characterized in that the circuit means includes a second control valve having an inlet port fluidly connected to the first line, an outlet port fluidly connected to the return line means, and a ram port fluidly connected to the ram, and a valve member manually operable between a first position fluidly connecting the inlet port to the ram port and blocking fluid communication between the ram port and the return port, and a second position fluidly connecting the ram port to the return port and blocking fluid communication between the ram port and the inlet port.

20. The apparatus of claim 18 further characterized in that said circuit means includes fourth and fifth pressure and return lines fluidly connected to the second and third lines respectively, a pressure sixth line connected to said first line and control means for controlling the flow of fluid under pressure from the sixth line to the fourth and fifth lines respectively and the return of fluid from the fifth and fourth lines respectively to the return line means.

21. The apparatus of claim 20 further characterized in that the last mentioned control means includes a second control valve operable between a first position fluidly connecting the fourth line to the sixth line and the fifth line to the return line means, a second position fluidly connecting the fifth line to the sixth line and fourth line to the return line means and a neutral third position blocking fluid flow from the sixth line to either of the fourth and fifth lines, and means connected to the tie rod opposite end for operating the second control valve between its positions.

22. The apparatus of claim 21 further characterized in that said circuit means includes a third control valve having an inlet port and an outlet port forming part of the sixth line, a return line port fluidly connected to the return line means and a ram port fluidly connected to the ram, and a manually operated valve member movable between a position blocking fluid flow between the inlet and outlet ports while fluidly connecting the inlet port to the ram port and a second position fluidly connecting the inlet port to the outlet port and the ram port to the return port, and that a flow control is provided in the sixth line to restrict the flow of fluid therethrough to permit the steering through the operation of the first valve overriding the steering control provided through the operation of the second valve.

23. For a tractor having a steerable wheel, a two-way piston cylinder combination for steering the steerable wheel, a motor driven pump and a reservoir fluidly connected in series, a first line fluidly connected to the pump, a second line fluidly connected to one end of the cylinder, a third line fluidly connected to the reservoir, a fourth line fluidly connected to the other end of the cylinder, first operable valve means for selectively controlling the flow of fluid under pressure between the first line and one of the second and fourth lines and the return of fluid from the other of the fourth and second lines to the third line, and manually operated steering means for controlling the valve means, an automatic steering system that includes a fifth line fluidly connected to the first line, a sixth line fluidly connected to the second line, a seventh line for returning fluid to the reservoir, an eighth line fluidly connected to the fourth line, operable second valve means fluidly connected to the fifth through eighth lines that is operable between a first position to block fluid flow between any of the fifth through eighth lines, a second position to fluidly connect the fifth line to the sixth line and the seventh line to the eighth line, and a third position to fluidly connect the fifth line to the eighth line and the sixth line to the seventh line, and sensing means mounted on the tractor to follow a marked path as the tractor advances and operates the second valve means between its positions to control the flow of fluid in the fifth through eighth lines to and from the ends of the cylinder to maintain direction of travel of the tractor nearly parallel to the adjacent part of said path.

24. The apparatus of claim 23 further characterized in that a flow control is provided in the fifth line to restrict flow therethrough to permit manual steering overriding automatic steering, and that a pressure regulator is provided in the seventh line to block the complete drainage of fluid from the sixth and eighth lines when they are respectively fluidly connected to the seventh line.

\* \* \* \* \*

PO-1050
(5/69)

UNITED STATES PATENT OFFICE
CERTIFICATE OF CORRECTION

Patent No. 3,765,501            Dated October 16, 1973

Inventor(s)   Alfred B. Burvee

It is certified that error appears in the above-identified patent and that said Letters Patent are hereby corrected as shown below:

Column 1, line 9 "adpated" should be --adapted--. Column 2, line 17 "whle" should be --while--. Column 4, line 46 "49" should be --46--. Column 7, line 28, (Claim 9, line 21) "either" should be --neither--.

Signed and sealed this 12th day of March 1974.

(SEAL)
Attest:

EDWARD M. FLETCHER, JR.            C. MARSHALL DANN
Attesting Officer                     Commissioner of Patents